(12) United States Patent  
Kano et al.

(10) Patent No.: US 10,146,380 B2  
(45) Date of Patent: Dec. 4, 2018

(54) TOUCH INPUT DEVICE AND MOBILE DISPLAY DEVICE

(71) Applicant: Murata Manufacturing Co., Ltd., Nagaokakyo-shi, Kyoto-fu (JP)

(72) Inventors: Hidekazu Kano, Nagaokakyo (JP); Hiroaki Kitada, Nagaokakyo (JP); Takafumi Inoue, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/139,685

(22) Filed: Apr. 27, 2016

(65) Prior Publication Data

US 2016/0239127 A1    Aug. 18, 2016

Related U.S. Application Data

(63) Continuation of application No. PCT/JP2014/078300, filed on Oct. 24, 2014.

(30) Foreign Application Priority Data

Nov. 1, 2013  (JP) .................................. 2013-228535

(51) Int. Cl.
    *G09G 5/00*    (2006.01)
    *G06F 3/044*   (2006.01)
    (Continued)

(52) U.S. Cl.
    CPC ............ *G06F 3/044* (2013.01); *G06F 3/0414* (2013.01); *G06F 3/0416* (2013.01); *G06F 3/0488* (2013.01); *G06F 3/04883* (2013.01)

(58) Field of Classification Search
    CPC ...... G06F 3/044; G06F 3/0414; G06F 3/0416; G06F 3/04883
    (Continued)

(56) References Cited

U.S. PATENT DOCUMENTS

| 8,004,498 B1 | 8/2011 | Meridian |
| 2013/0016042 A1* | 1/2013 | Makinen ................. G06F 3/016 345/168 |

(Continued)

FOREIGN PATENT DOCUMENTS

| JP | 2013025594 A | 2/2013 |
| JP | 2013069190 A | 4/2013 |

(Continued)

OTHER PUBLICATIONS

International Search Report PCT/JP2014/078300, dated Nov. 18, 2014.
Written Opinion for PCT/JP2014/018300, dated Nov. 18, 2014.

*Primary Examiner* — Jennifer Nguyen

(74) *Attorney, Agent, or Firm* — Arent Fox LLP

(57) ABSTRACT

A touch input device includes a sensor for detecting a plurality of touch positions at which a touch operation has been performed on an operation surface, a pressure sensor for detecting a pressing operation which has been performed on the operation surface at at least one of the touch positions, and a control unit. The control unit (a) identifies a first of the touch positions as a support position which is not used to input information into the input device by way of movement of the support position, (b) identifies at least second and third of the touch positions as input touch positions used to input information into the input device by way of movement of the input touch positions, and (c) causes the input device to carry out an operation identified by the movement of the input touch positions.

20 Claims, 14 Drawing Sheets

(51) Int. Cl.
*G06F 3/0488* (2013.01)
*G06F 3/041* (2006.01)

(58) Field of Classification Search
USPC .......................................... 345/156, 168, 173
See application file for complete search history.

(56) References Cited

U.S. PATENT DOCUMENTS

| | | | |
|---|---|---|---|
| 2013/0106842 A1* | 5/2013 | Miyazawa | G06F 3/041 345/419 |
| 2014/0125515 A1 | 5/2014 | Turcotte et al. | |
| 2014/0232676 A1 | 8/2014 | Shimizu | |
| 2014/0368260 A1* | 12/2014 | Tanada | G06F 3/04883 327/517 |
| 2015/0042590 A1 | 2/2015 | Ando et al. | |
| 2016/0238466 A1* | 8/2016 | Tanimoto | G01L 1/16 |

FOREIGN PATENT DOCUMENTS

| | | |
|---|---|---|
| JP | 2013088929 A | 5/2013 |
| JP | 2013175139 A | 9/2013 |
| WO | WO 2013161784 A1 | 10/2013 |

\* cited by examiner

| THE NUMBER OF EFFECTIVE TOUCH POSITIONS | PROCESSING OPERATION | PROCESSING OPERATION |
|---|---|---|
| | INPUT OPERATION | INPUT OPERATION |
| 1 | PROCESSING OPERATION A | |
| | INPUT OPERATION A<br>MOVE EFFECTIVE TOUCH POSITIONS | |
| 2 | PROCESSING OPERATION B | PROCESSING OPERATION C |
| | INPUT OPERATION B<br>CHANGE OF DISTANCE BETWEEN EFFECTIVE TOUCH POSITIONS | INPUT OPERATION C<br>MOVEMENT ALONG CIRCUMFERENCE WHOSE CENTER IS MIDPOINT OF EFFECTIVE TOUCH POSITIONS |
| 3 | PROCESSING OPERATION D | |
| | INPUT OPERATION D<br>PARALLEL MOVEMENT OF EFFECTIVE TOUCH POSITION | |

FIG. 8

TOUCH INPUT DEVICE AND MOBILE DISPLAY DEVICE

CROSS REFERENCE TO RELATED APPLICATIONS

The present application is a continuation of International application No. PCT/JP2014/078300, filed Oct. 24, 2014, which claims priority to Japanese Patent Application No. 2013-228535, filed Nov. 1, 2013, the entire contents of each of which are incorporated herein by reference.

TECHNICAL FIELD

The present invention relates to a touch input device which allows a user to input instructions using his or her fingers.

BACKGROUND ART

Conventionally, a touch input device includes a touch panel which detects where a user touches the touch panel as well as the force with which he or she presses down on the touch panel. Such devices typically include a control circuit which performs processing according to an input operation of the user.

For example, a mobile information device disclosed in Patent Literature 1 includes a touch input device and a display. According to the mobile information device disclosed in Patent Literature 1, when a user performs a series of operations by moving fingers while keeping the fingers in contact with a touch panel, and pressing the touch panel at a touch position after the movement, a control unit (control circuit) changes a scroll speed of images displayed on the display.

Thus, the touch input device detects not only a touch operation with respect to the touch panel but also a pressing operation to increase operations which the touch input device can accept.

A touch input device is not limited to an example disclosed in Patent Literature 1 and can accept an operation, too, performed by moving touching fingers while applying a press thereto by providing a pressing operation detecting unit.

CITATION LIST

Patent Literature

PTL 1: Japanese Patent Application Laid-Open No. 2013-25594

SUMMARY OF THE INVENTION

A touch input device according to at least some aspects of the invention includes a sensor for detecting a plurality of touch positions at which a touch operation has been performed on an operation surface, a pressure sensor for detecting a pressing operation which has been performed on the operation surface at at least one of the touch positions; and a control unit which (a) identifies a first of the touch positions as a support position which is not used to input information into the input device by way of movement of the support position, (b) identifies at least second and third of the touch positions as input touch positions used to input information into the input device by way of movement of the input touch positions, and (c) causes the input device to carry out an operation identified by the movement of the input touch positions.

In one embodiment the control unit identifies the first touch position as a support position as a function of the location of the first touch position on the operation surface. The control unit can identify the touch position falling within a predetermined area of the operation surface as the support position. The predetermined area is preferably located adjacent a corner of the operation surface.

The control unit preferably uses the movement of the input touch positions which occur after a pressing force has been applied at the support position to identify the operation carried out by the input device. The touch input device according to claim 1, wherein the control unit causes the input device to carry out an operation identified by the movement of the input touch positions only during the time period during which a pressing operation is applied to the operation surface.

In another embodiment, the control unit causes the input device to carry out an operation identified by variations in a pressing force applied to the operation surface at the support position.

In one embodiment, the control unit identifies first of the touch positions as the support position as a function of the order in which the touch operations were carried out at each of the touch positions. In that embodiment, the control unit preferably identifies the touch position at which a touching operation was first carried out as the support position.

In another embodiment, the control unit identifies all of the touch positions, other than the touch position at which a touching operation was first carried out, as the input touch positions. In that embodiment, it is preferable that before any pressing operation has been performed at any of the touch positions, the control unit stores, for each touch position, the location of the touch position on the operation surface and the timing at which a touch operation was applied at the touch position. The control unit then preferably identifies the touch position at which a pressing operation was first carried out as the support position.

In another aspect of the invention, the control unit identifies each respective touch position as either the support position or one of the input touch positions as a function of (a) whether a pressing operation was carried out the respective touch position and (b) the timing at which a touch operation was performed at the respective touch position.

In a further aspect of the invention, the control unit identifies the touch position which is the support position as a function of the movements of all of the touch positions.

In yet a further aspect of the invention, the control unit identifies the touch position which has the least movement over a predetermined period as the support position.

The control unit can identify the first of the touch positions as the support position by comparing the movement of different sub-combinations of the touch positions to a pre-stored sequence of movements of the input touch positions.

The control unit can also identify the first of the touch positions as the support position by comparing the movement of different sub-combinations of the touch positions to a pre-stored set of input operations, each input operation of the set corresponding to a different sequence of movements.

The pressure sensor preferably includes a piezoelectric film made of a chiral polymer. The chiral polymer is preferably uniaxially stretched polylactic acid. The sensor for detecting a plurality of touch positions is a capacitive sensor.

BRIEF EXPLANATION OF DRAWINGS

FIG. 8 is a view illustrating contents stored in a database 140.

MODE FOR CARRYING OUT THE INVENTION

Figure 1:
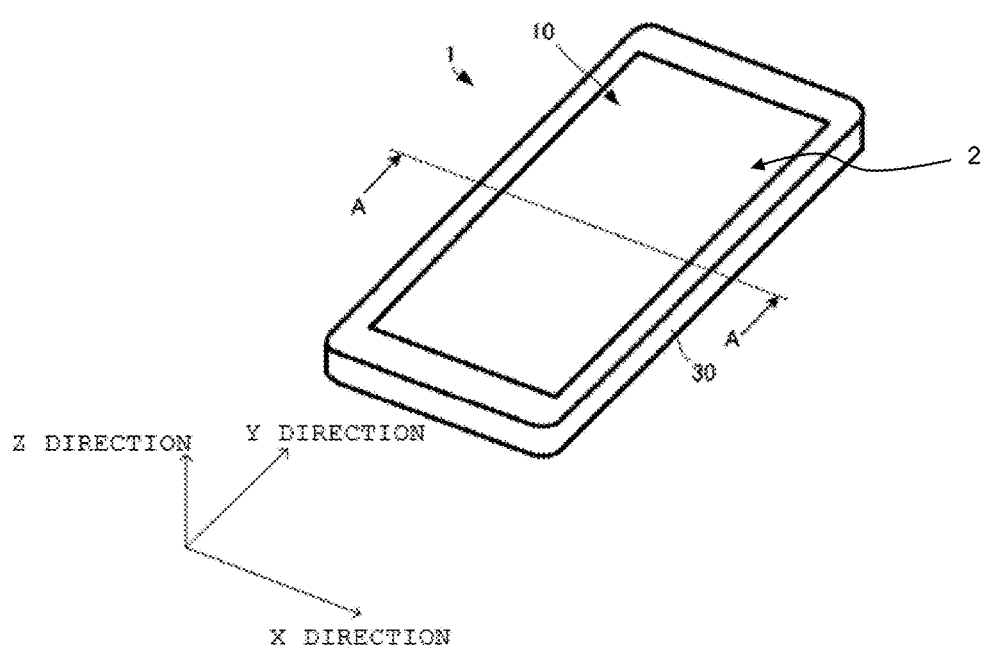
FIG. 1 is an external perspective view of an operation terminal 1 according to a first embodiment.
Figure 2:
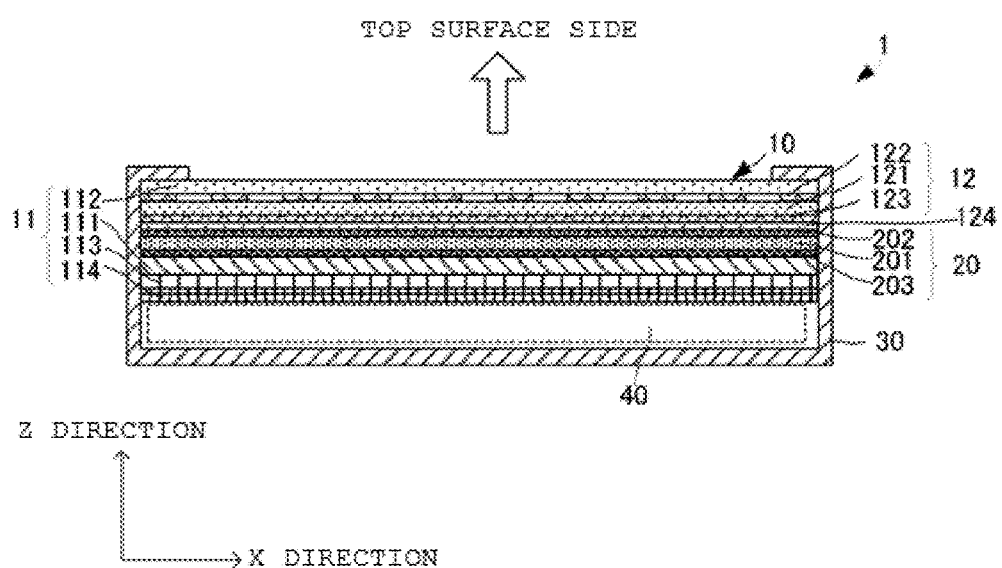
FIG. 2 is a sectional view of the operation terminal 1 according to the first embodiment taken along line A-A.
Figure 3:
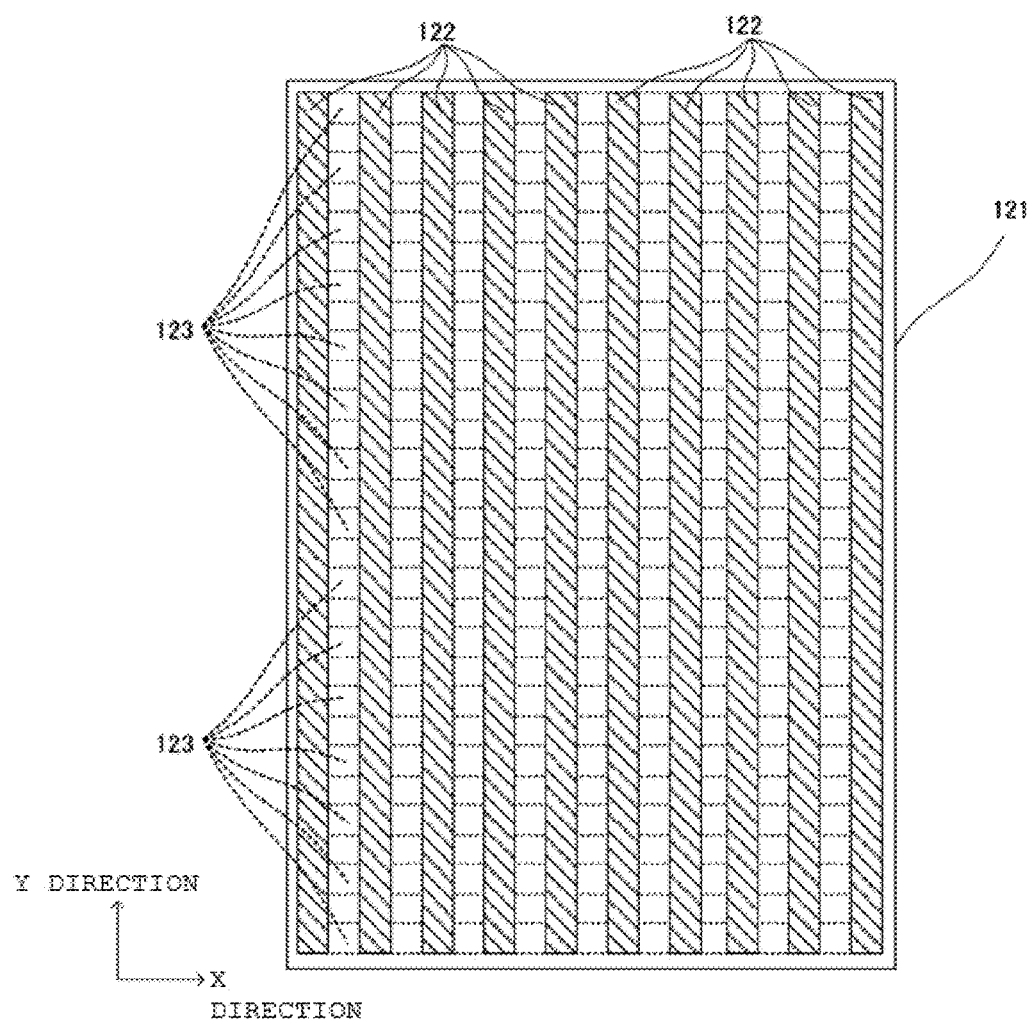
FIG. 3 is a plan view of an electrostatic sensor 12.
Figure 4:
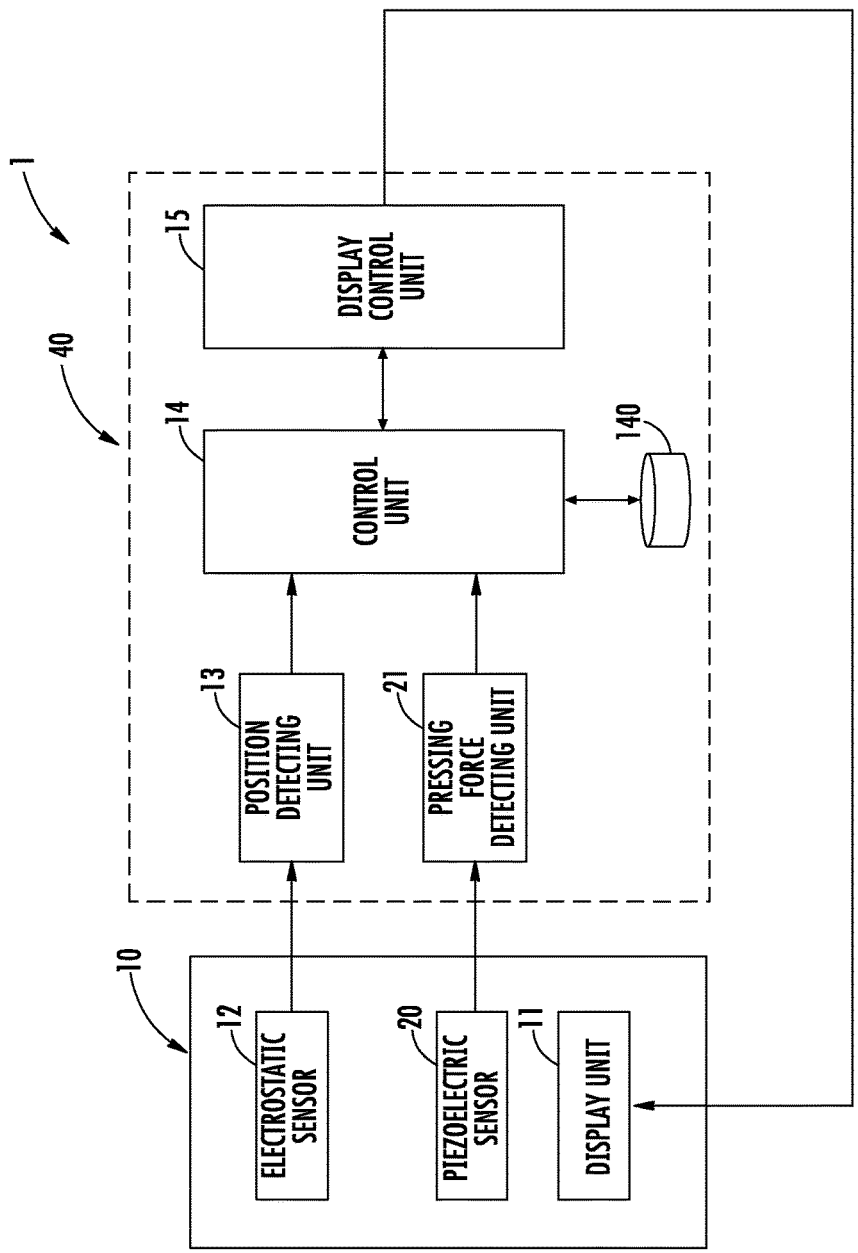
FIG. 4 is a block diagram illustrating part of a configuration of the operation terminal 1 according to the first embodiment.

An operation terminal 1 according to the first embodiment of the present invention will be described with reference to FIGS. 1 to 4. FIG. 1 is an external perspective view of the operation terminal 1. FIG. 2 is a sectional view of the operation terminal 1 taken along line A-A. FIG. 3 is a plan view of an electrostatic sensor 12. FIG. 4 is a block diagram illustrating part of the configuration of the operation terminal 1.

As illustrated in FIG. 1, the operation terminal 1 includes a housing 30 preferably having a nearly cuboid shape. An opening is formed in a surface of the housing 30 and a touch unit 10 having an operation surface 2 is located in the opening. For purposes of reference, an X direction illustrated in FIG. 1 is a width direction of the housing 30, a Y direction is a height direction and a Z direction is a thickness direction. In the present embodiment, the width of the housing 30 is shorter than the height of the housing 30. However, the width and the height of the housing 30 may have the same lengths or may have the longer width than the height. Further, the operation terminal 1 need not be portable and may be an installed device.

An operation surface 2 of the touch input unit 10 is exposed through the opening of the housing 30. Thus, a Z side surface of the touch input unit 10 serves as both the operation surface 2 and a display surface.

As illustrated in FIG. 2, the touch input unit 10 and an arithmetic circuit module 40 (processor) are disposed inside the housing 30. The arithmetic circuit module 40 and the display input unit 10 are disposed in order in the thickness direction.

As illustrated in FIG. 2, the touch input unit 10 preferably includes a display unit 11, an electrostatic sensor 12, a piezoelectric sensor 20 and an insulation film 124. The display unit 11, the electrostatic sensor 12 and the piezoelectric sensor 20 preferably have nearly same shape as viewed from a top surface side of the housing 30. The display unit 11 is not an indispensable component of the present embodiment.

As illustrated in FIG. 2, the display unit 11 includes a liquid crystal panel 111, a top surface polarizing plate 112, a back surface polarizing plate 113 and a backlight 114.

The backlight 114, the back surface polarizing plate 113, the liquid crystal panel 111, the piezoelectric sensor 20, the insulation film 124, the electrostatic sensor 12 and the top surface polarizing plate 112 are preferably disposed in order in the thickness direction. This order is not required and, for example, the piezoelectric sensor 20 and the electrostatic sensor 12 may be provided in a reverse arrangement.

As illustrated in FIGS. 2 and 3, the electrostatic sensor 12 includes a base film 121, a plurality of capacitance detection electrodes 122 and a plurality of capacitance detection electrodes 123.

The base film 121 is preferably made of a material having translucency and a predetermined dielectric constant. The capacitance detection electrodes 122 and 123 are preferably elongated in shape and made of a translucent conductive material. Capacitance detection electrodes 122 are preferably aligned with each other and formed at predetermined intervals on a first principal surface (+Z side surface) of the base film 121. The capacitance detection electrodes 123 are preferably aligned with each other and formed at predetermined intervals on a second principal surface (−Z side surface) of the base film 121. The alignment direction of the capacitance detection electrodes 122 and the alignment direction of the capacitance detection electrodes 123 are preferably orthogonal to each other when viewed from a normal direction of the first principal surface or the second principal surface of the base film 121.

When a user's finger approaches the electrostatic sensor 12 it causes a capacitance change. A position detecting unit 13 detects a "touch" operation when the capacitance changes by a certain amount. Thus, a touch can be detected even when the user's finger does not actually touch the operation surface. A touch position is identified by specifying a pair of the capacitance detection electrode 122 and 123 whose capacitance has changed. Further, the position detecting unit 13 detects a plurality of touch positions by specifying a plurality of pairs of the capacitance detection electrodes 122 and 123 whose capacitances have changed. While the touch positions are preferably capacitively detected it is also possible to detect touch positions by using an optical sensor which detects approaches of fingers to the top surface polarizing plate 112 instead of using the electrostatic sensor 12. Other detectors may also be used.

When detecting touch positions, the position detecting unit 13 outputs information relating to the touch positions to a control unit 14 (FIG. 4).

As illustrated in FIG. 2, the piezoelectric sensor 20 preferably includes a piezoelectric film 201, a piezoelectric detection electrode 202 and a piezoelectric detection electrode 203. The piezoelectric film 201, the piezoelectric detection electrode 202 and the piezoelectric detection electrode 203 each preferably have a flat film shape.

The piezoelectric detection electrode 202 is preferably formed on the first principal surface (+Z side surface) of the piezoelectric film 201. The piezoelectric detection electrode 203 is preferably formed on the second principal surface (−Z side surface) of the piezoelectric film 201. The piezoelectric detection electrode 202 and the piezoelectric detection electrode 203 are preferably formed as either organic electrodes whose main components are ITO, ZnO and polythiophene or organic electrodes whose main component is polyaniline, silver nanowire electrodes and carbon nanotube electrodes so that the electrodes are transparent.

The piezoelectric film 201 is preferably made of, for example, uniaxially stretched polylactic acid and has translucency. Further, the piezoelectric film 201 produces electric charges in the first and second principal surfaces when pressed in the −Z direction. When electric charges are produced in the first and second principal surfaces of the piezoelectric film 201, a potential difference between the piezoelectric detection electrode 202 and the piezoelectric detection electrode 203 is produced. This potential difference level (e.g. mV) corresponds to the amount the piezoelectric film 201 is compressed in response to the pressing force applied to the operation surface 2. The amount is, for example, several tens of By calculating the potential difference level (mV) between the piezoelectric detection electrode 202 and the piezoelectric detection electrode 203, it is possible to detect whether or not a pressing operation has been performed on the piezoelectric sensor 20, and to calculate a pressing force.

The piezoelectric film 201 is preferably made of chiral polymers. As the chiral polymers, polylactic acid (PLA) and, more particularly, poly-L-lactic acid (PLLA) is used in the present embodiment. The PLLA is uniaxially stretched.

The PLLA belongs to a group of very high piezoelectric constants among polymers, and therefore is suitable for the piezoelectric sensor 20.

Further, the PLLA does not have pyroelectricity unlike other ferroelectric piezoelectric bodies (e.g. PVDF). Hence, the PLLA is suitable for a component such as the piezoelectric sensor 20 of the display input unit 10 to which a temperature of the finger is transmitted by a touch operation.

Further, the PLLA is made of chiral polymers, and therefore has higher translucency than PVDF and the like. Hence, the PLLA is suitable for a component such as the piezoelectric sensor 20 of the display input unit 10 which is disposed closer to the +Z side than the backlight 114.

The use of PLLA for the piezoelectric film 201 is preferred but not required. For the piezoelectric sensor 20, a piezoelectric film 201 made of, for example, the PVDF may be used.

As illustrated in FIG. 4, the piezoelectric sensor 20 outputs as a sensor signal a potential difference between the piezoelectric detection electrode 202 and the piezoelectric detection electrode 203 and applies it as an input to a pressing force detecting unit 21. The pressing force detecting unit 21 detects a level LSS (mV) of the inputted sensor signal and determines whether a pressing operation has been performed on the piezoelectric sensor 20 as a function of the detected level LSS. When, for example, the level LSS is less than 20 mV, the piezoelectric sensor result detecting unit 21 determines that a pressing operation has not been performed. When the level LSS is 20 mV or more, the pressing force detecting unit 21 determines that a pressing operation has been performed. Whether a pressing operation has been performed is determined based on a threshold used by the pressing force detecting unit 21 so that it is easy to distinguish between a touch operation and a pressing operation with respect to the display input unit 10. The pressing force detecting unit 21 outputs information regarding whether or not a pressing operation has been performed to the control unit 14.

Back to explanation of the display unit 11, light outputted from the backlight 114 passes through the back surface polarizing plate 113, the liquid crystal panel 111, the piezoelectric sensor 20, the insulation film 124, the electrostatic sensor 12 and the top surface polarizing plate 112 in order. The liquid crystal panel 111 allows arriving light to transmit as is or by changing (polarizing) a vibration direction under control of a display control unit 15. Thus, display contents of the display unit 11 are changed by controlling the backlight 114 and the liquid crystal panel 111.

The piezoelectric sensor 20 is preferably translucent and therefore even when the piezoelectric sensor 20 is disposed closer to the +Z side than the backlight 114, the piezoelectric sensor 20 does not block transmission of light from the backlight 114. Neither the display unit 11 nor the translucency of the piezoelectric sensor 20 are indispensable components in the present embodiment.

As described above, the control unit 14 receives an input of information concerning the touch positions detected by the touch position detecting unit 13 and information regarding whether or not a pressing operation has been performed from the pressing force detecting unit 21. The control unit 14 performs various types of processing based on this information. For example, the display control unit 15 changes display contents of the display unit 11 based on information of processing outputted from the control unit 14 and related to display. The operation terminal 1 acts as a GUI (Graphical User Interface). Again, the display unit 11 is not an indispensable component in the present embodiment and therefore the operation terminal 1 does not need to operate a GUI in the present embodiment.

The operation terminal 1 can detect the following input operations.

Figure 5:
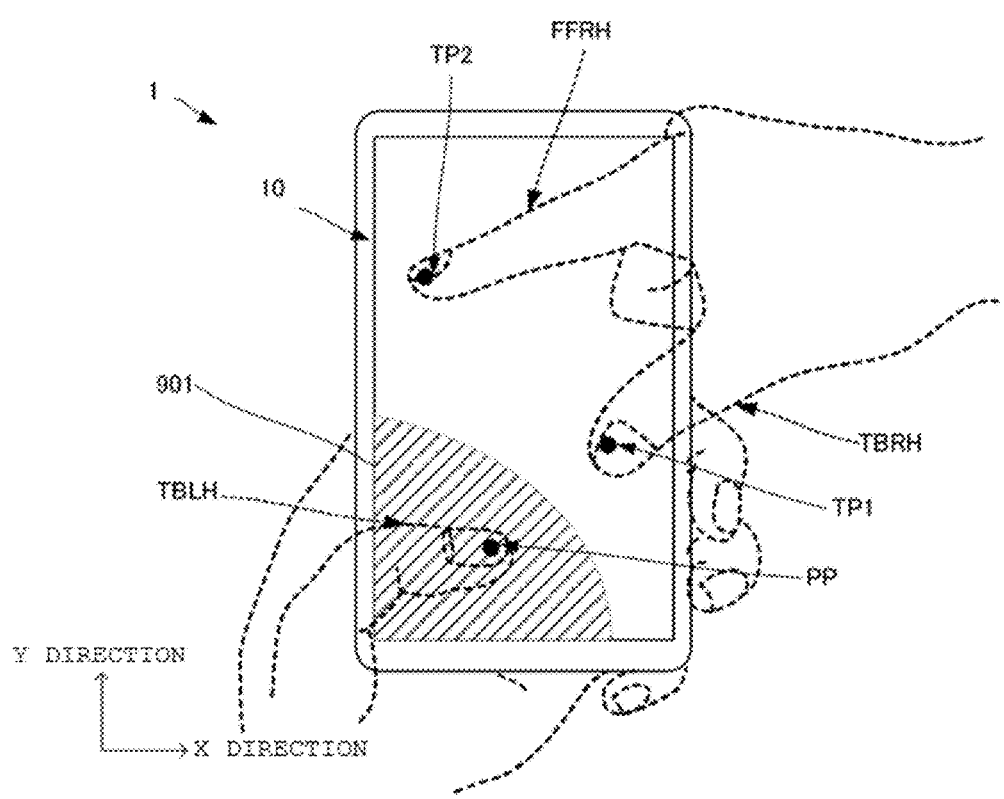
FIG. 5 is a view illustrating an example of the manner in which the operation terminal 1 can be used according to the first embodiment.
Figure 6:
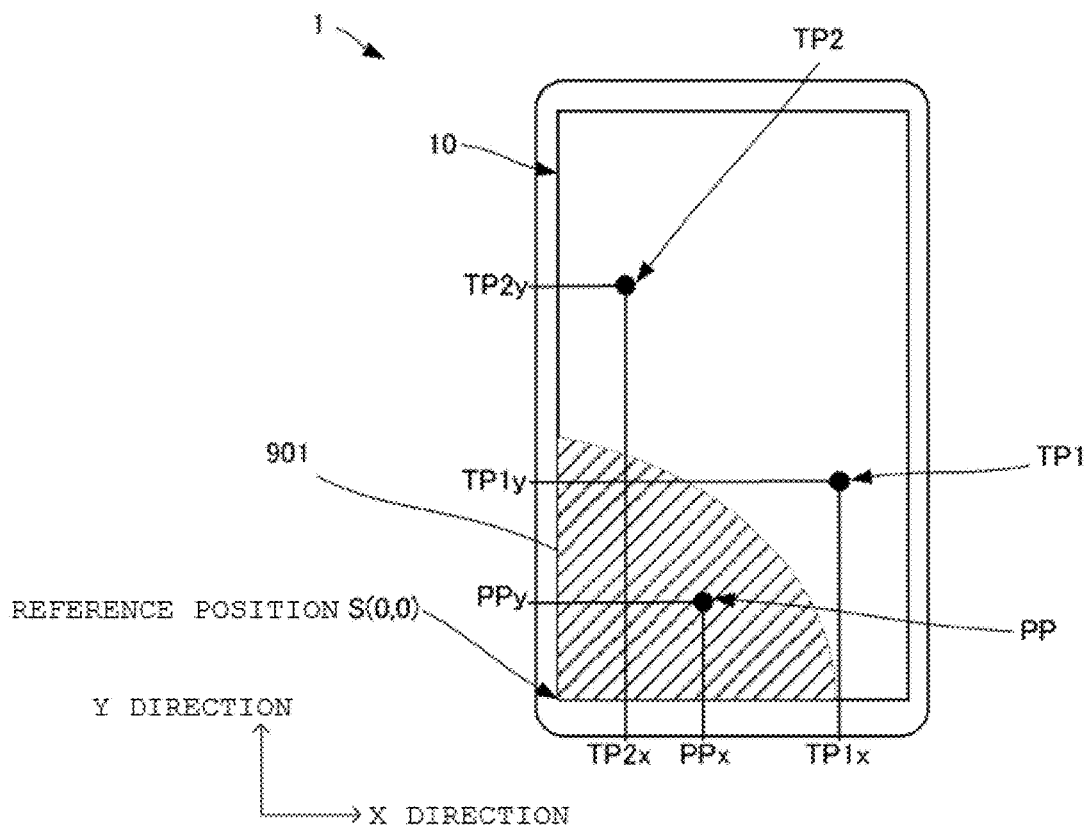
FIG. 6 is a view illustrating an example where the operation terminal 1 according to the first embodiment detects three touch positions.
Figure 7:
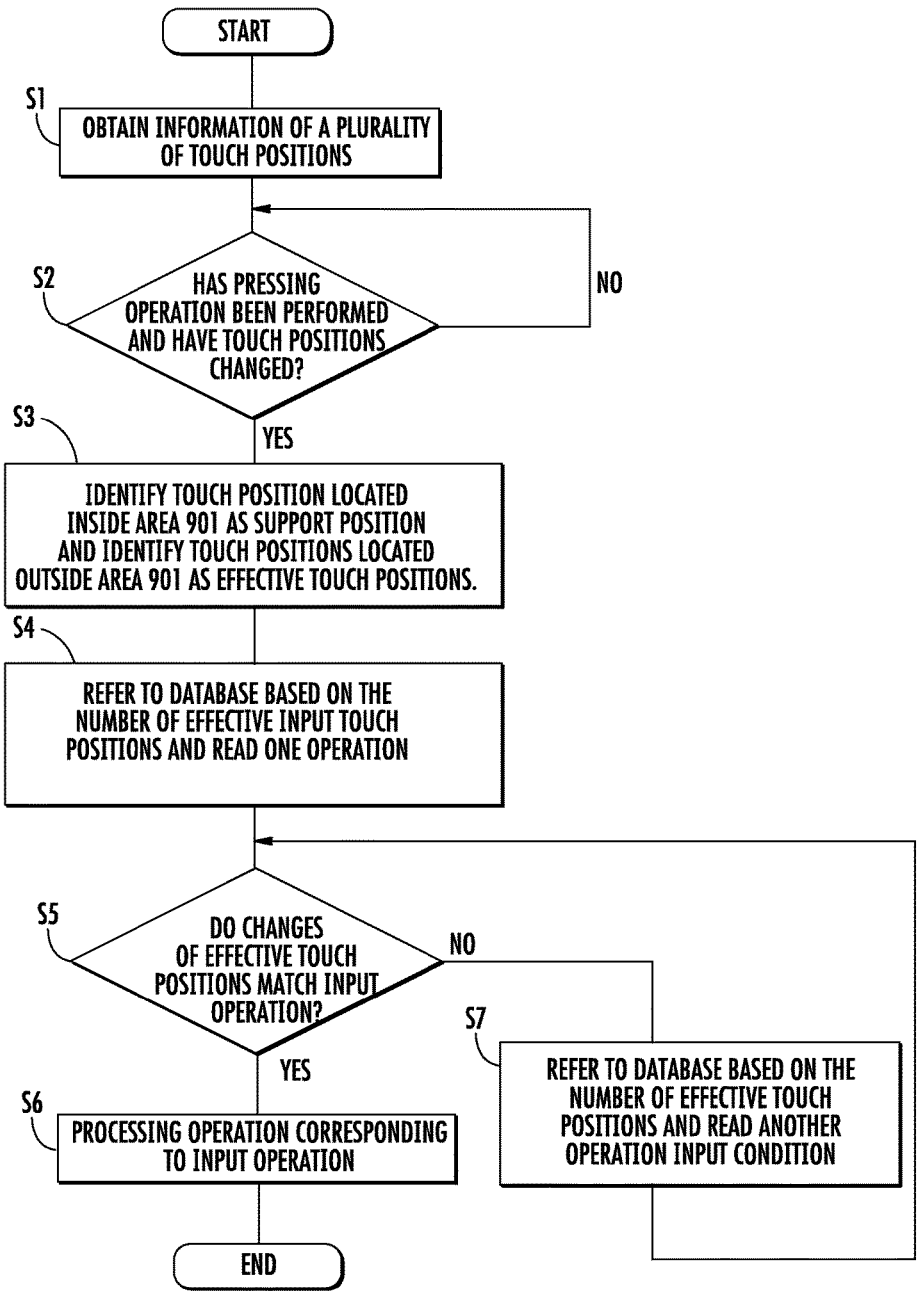
FIG. 7 is a flowchart illustrating an algorithm carried out by a control unit 14 of the operation terminal 1 according to the first embodiment.

FIGS. 5 and 6 illustrate an exemplary input to operation terminal 1. FIG. 7 is a flowchart illustrating an operation of the control unit 14 of the operation terminal 1 (a flow chart of the algorithm carried out by the arithmetic unit module 40). The operation of the control unit 14 will be described by using the examples illustrated in FIGS. 5 and 6, respectively.

First, the control unit 14 obtains information concerning a plurality of touch positions from the position detecting unit 13 (51).

Let's assume that, as illustrated in FIG. 5, a user touches the display input unit 10 at a touch position PP with the thumb TBLH of his or her left hand and touches the display input unit 10 at touch positions TP1 and TP2 with the thumb TBRH of his or her right hand.

In the examples illustrated in FIGS. 5 and 6, respectively, the control unit 14 obtains information from electrostatic sensor 12 identifying the three touch positions and outputs coordinate information (PPx, PPy), (TP1x, TP1y) and (TP2x, TP2y) identifying the location of each touch position. These coordinates are all expressed relative to a reference position S (0,0). In the preferred embodiment, the position detecting unit 13 sets units of the coordinates (PPx, PPy), (TP1x, TP1y) and (TP2x, TP2y) to millimeters (mm). In the preferred embodiment the reference position S is at the lower left hand corner of the touch input unit 10. However, the reference position S may be any position in the display area of the touch input unit 10, and the coordinate unit is not limited to millimeters (mm), and may be, for example, the number of pixels.

Next, as shown in FIG. 7, the control unit 14 determines whether a pressing operation has been performed and whether the touch positions have changed (S2). The information regarding whether or not a pressing operation has been performed is obtained from the piezoelectric sensor result detecting unit 21. When control unit 14 determines that a pressing operation has been performed and that the touch positions have changed (S2: YES), the control unit 14 moves to step S3. When it determines that the pressing operation has been performed and the touch positions have not changed (S2: No), the control unit 14 stands by. In addition, in step S2, in case where the pressing operation is not performed but the touch positions have changed, the control unit 14 may execute processing (for example displaying an enlarged image) corresponding to changes of the touch positions.

Let's assume that, in the examples illustrated in FIGS. 5 and 6, respectively, the user presses the operation surface 2 of the display input unit 10 using the thumb TBLH of his or her left hand and touches the operation surface 2 with the thumb TBRH and forefinger FFRH of his or her right hand, and also moves one of his or her fingers. Then, the piezoelectric sensor result detecting unit 21 outputs information indicating that a pressing operation has been performed. At least one of the coordinates (PPx, PPy), (TP1x, TP1y) and (TP2x, TP2y) outputted from the position detecting unit 13 changes. As a result, the control unit 14 determines that the pressing operation has been performed on the operation surface 2 and at least one of the touch positions have changed (S2: YES), and moves to step S3.

When making the determination set forth in step S2, the control unit 14 makes a distinction between touch points located inside a predesignated area 901 and touch points located outside of area 901. The area 901 can be, for example, an area which is easily pressed by the user's hand. In this case, it is the area which can be easily touched by the user's left hand thumb TBLH. Touches that occur in area 901 are treated as a "support position" and touches taking place outside the area 901 are treated as "input operation touch positions."

The control unit 14 only uses touches in the area 901 as an input for a pressing operation. Even if a single touch position is detected, the control unit 14 may determine whether the touch position falls within area 901 and distinguish in advance the touch position as either an input operation touch position or a support position.

A database 140 stores information regarding a plurality of touch input operations (e.g., certain types of movements of the user's fingers) and identifies a corresponding terminal operation (e.g., displaying an image on a full screen) which should be carried out upon detection of the input operation. As shown by way of example in FIG. 8, these input operations are preferably categorized as a function of the number of input operation touch positions as which the operation surface 2 is touched.

At step S3, control unit 14 reads a first input operation (e.g., change of distance between input operation touch positions) from the database 140. At step S5, control unit 14 determines whether the actual input operation corresponds to the first input operation. If so (S5: Yes), it causes the operation terminal 1 to carry out the corresponding terminal operation B (e.g., displaying an image on a full screen (step S6).

If the actual touch input operation does not correspond to the first input operation (S5: No), the control unit 14 reads the next input operation corresponding to two input operation touch positions (e.g., movement along circumference whose center is midpoint of the input operation touch positions) from the database 140 (step S7) and determines whether the actual input operation corresponds to the next (second) input operation read from database 140. If so (S5: Yes), control unit 14 causes the corresponding operation (e.g., operation C) to be carried out (step S6). If not, control unit 14 reads the next input operation (if any) from the database 140 and compares that to the actual input operation. Once the actual input operation has been determined to correspond to one of the input operations stored in database 140 and the corresponding input unit operation is processed (step S6), the process of FIG. 7 ends.

When the control unit 14 cannot read an operation input condition in steps S4 and S7 (when there is no operation input matching the number of input operation touch positions or when all of the input operations matching the number of input operation touch positions have been read out), the control unit 14 finishes the processing (End). Further, when the control unit 14 cannot read the operation input conditions in steps S4 and S7, instead of finishing the processing, the control unit 14 may return to step S4 by being triggered by additional changes of input operation touch positions while continuing a pressing operation. Consequently, the user can continuously input an operation to the operation terminal 1 without completely moving his or her fingers away from the operation surface 2.

The control unit 14 continues executing the processing in steps S1 to S7 until one of the user's fingers is moved away from the operation surface 2. This is detected by detecting a decrease in the number of touch positions.

Figure 9:
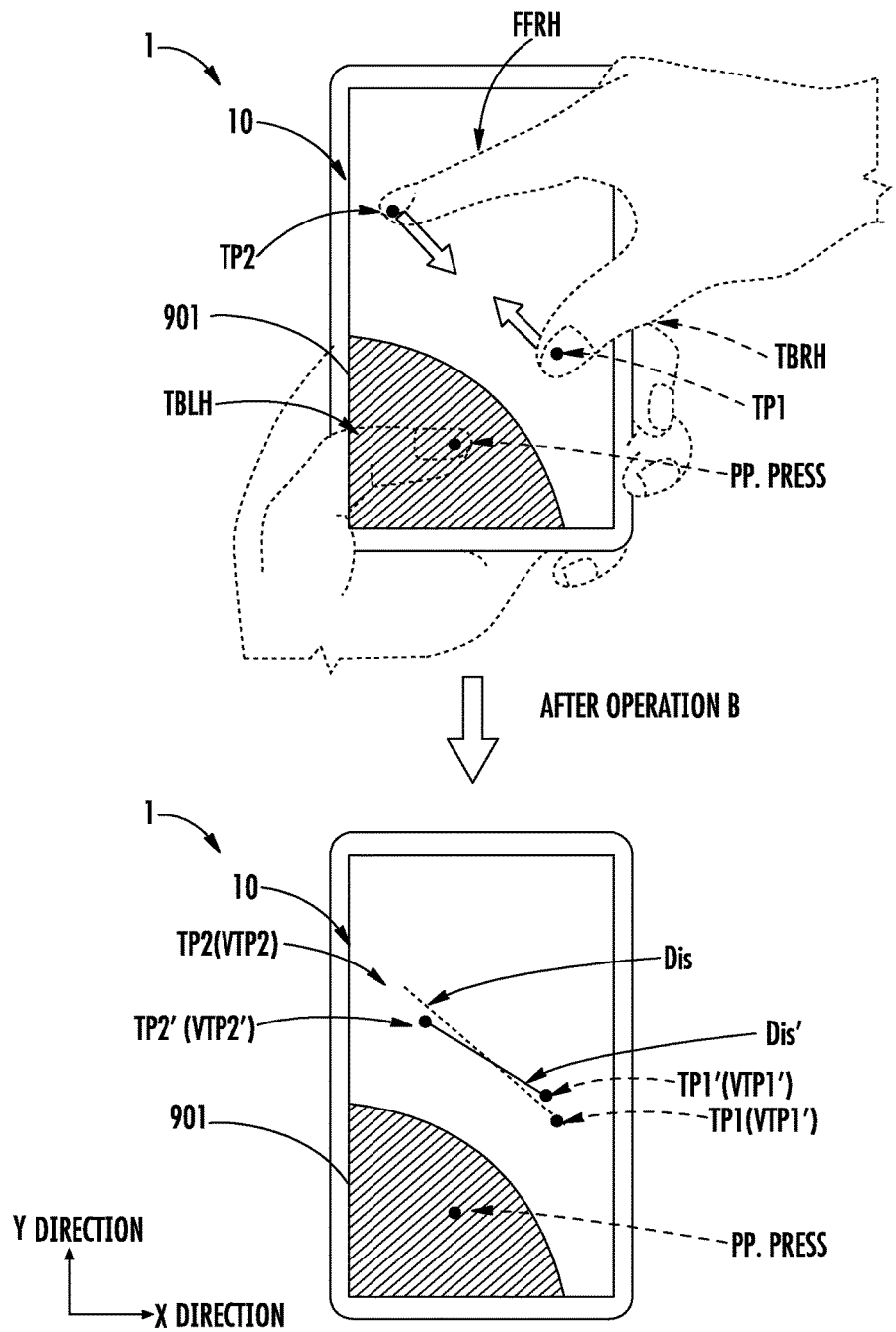
FIG. 9 is a view illustrating an example of an input operation to the operation terminal 1 according to the first embodiment.

A processing example in step S3 to step S7 will be described in detail with reference to FIGS. 9 and 10. FIG. 9 is a view illustrating an example of an operation with respect to the operation terminal 1.

In the example in FIG. 9, the user performs an input operation B on the operation terminal 1. As illustrated in FIG. 8, the input operation B includes moving, for example, the thumb TBRH and forefinger FFRH of the user's right hand to change a distance between two touch positions while simultaneously pressing the display input unit 10.

As illustrated in FIG. 9, the user performs an input operation by moving the thumb TBRH and forefinger FFRH of his or her right hand close to each other while applying a pressing force with the thumb TBLH of his or her left hand. Then, he or she moves his or her fingers to cause the touch position TP1 to change to a touch position TP1', and the touch position TP2 to change to a touch position TP2'.

In the example illustrated in FIG. 9, the touch position PP is located in the area 901, and the touch positions TP1 and TP2 are located outside of the area 901. Hence, the control unit 14 identifies the touch position PP as the support position PP and identifies the touch positions TP1 and TP2 as input operation touch positions VTP1 and VTP2, respectively (S3). Further, the touch positions TP1' and TP2' after the user's fingers have moved will be referred to as an input operation touch position VTP1' and an input operation touch position VTP2', respectively.

Next, the control unit 14 searches a database 140 to find input operations corresponding to the number of input operation touch positions (two in the preset example) and reads a first input operation (S4). For example, the control unit 14 reads the input operation B (a change of a distance between input operation touch positions). Alternatively, the control unit 14 could read input operation C (arc movement whose center is a midpoint of input operation touch positions). The particular order in which the stored input operations are read out of database 140 is not critical.

Further, the control unit 14 determines whether the input operation (i.e., the changes of the input operation touch positions) match the read input operation (S5). In the example illustrated in FIG. 9, a distance Dis' (mm) between the input operation touch position VTP1' and the input operation touch position VTP2' is shorter than a distance Dis (mm) between the input operation touch position VTP1 and the input operation touch position VTP2. Hence, the control unit 14 determines that changes of the input operation touch positions VTP1 and VTP2 match the input operation corresponding to the operation B (S5: YES) and executes processing (e.g., displaying an image on the full screen) corresponding to the operation B (S6). The distance Dis is preferably calculated according to the following equation.

$$Dis = Sqrt((TP1x - TP2x)2 + (TP1y - TP2y)2)$$

wherein Sqrt is a function of calculating a square root. The distance Dis' is also calculated according to the above equation.

In the above example, the input operation B is inputted using three fingers (two of which correspond to input operation touch positions). However, it can be inputted using only the thumb TBRH and forefinger FFRH of the right hand, wherein the user moves his or her right handed thumb TBRH and forefinger FFRH closer to one other in the area outside of area 901 while also pressing the display input unit 10.

Thus, although the user can input the operation B to the operation terminal 1 using only two fingers (the thumb TBRH and the forefinger FFRH of the right hand), it is sometimes difficult to move the user's two fingers while simultaneously pressing the operation surface outside of the area 901. Particularly when the operation terminal 1 is a mobile terminal and is not fixed, it is difficult to move the two fingers while pressing the operation surface outside of the area 901. In this case, when a user's pressing force weakens, the operation terminal 1 does not detect a pressing operation and therefore cannot recognize the input operation B.

However, even when the display input unit 10 is touched at the support position PP inside the area 901, the operation terminal 1 identifies the support position PP as not being an input operation touch position and accepts the input operation B performed by moving the two fingers TBRH and FFRH outside of the area 901. Consequently, the user can reliably input the operation B by applying a support pressing force using his or her left hand thumb TBLH in the area 901 even when a pressing force applied by the two fingers of the user's right hand weakens during the input operation B outside of the area 901.

Further, the user's input of operation B is not influenced by the fact that the operation terminal 1 is held by the thumb TBLH of and palm of the user's left hand as illustrated in FIG. 9. Consequently, the user can input the operation B while stably holding the operation terminal 1.

In addition, the input operations are not limited to operations stored in the database 140. Further, an operation input condition may be defined by the force or pattern of force with which the user presses on the operation surface 2 in addition to or in lieu of the movement of his or her fingers across the operation surface 2. The force is detected by the piezoelectric sensor 20 of the display input unit 10. The pressing force is calculated as a function of the level LSS (mV) generated by the piezoelectric sensor detecting unit 21. In this case, the user can press the operation surface 2 in the area 901 so that it is easy for him or her to adjust the pressing force (corresponding to the press amount).

The database 140 is not an indispensable component in the present embodiment. The control unit 14 may distinguish between the support position PP, the input operation touch position VTP1 and the input operation touch position VTP2, and execute predetermined processing even when one of the input operation touch position VTP1 and the input operation touch position VTP2 changes.

Figure 10:
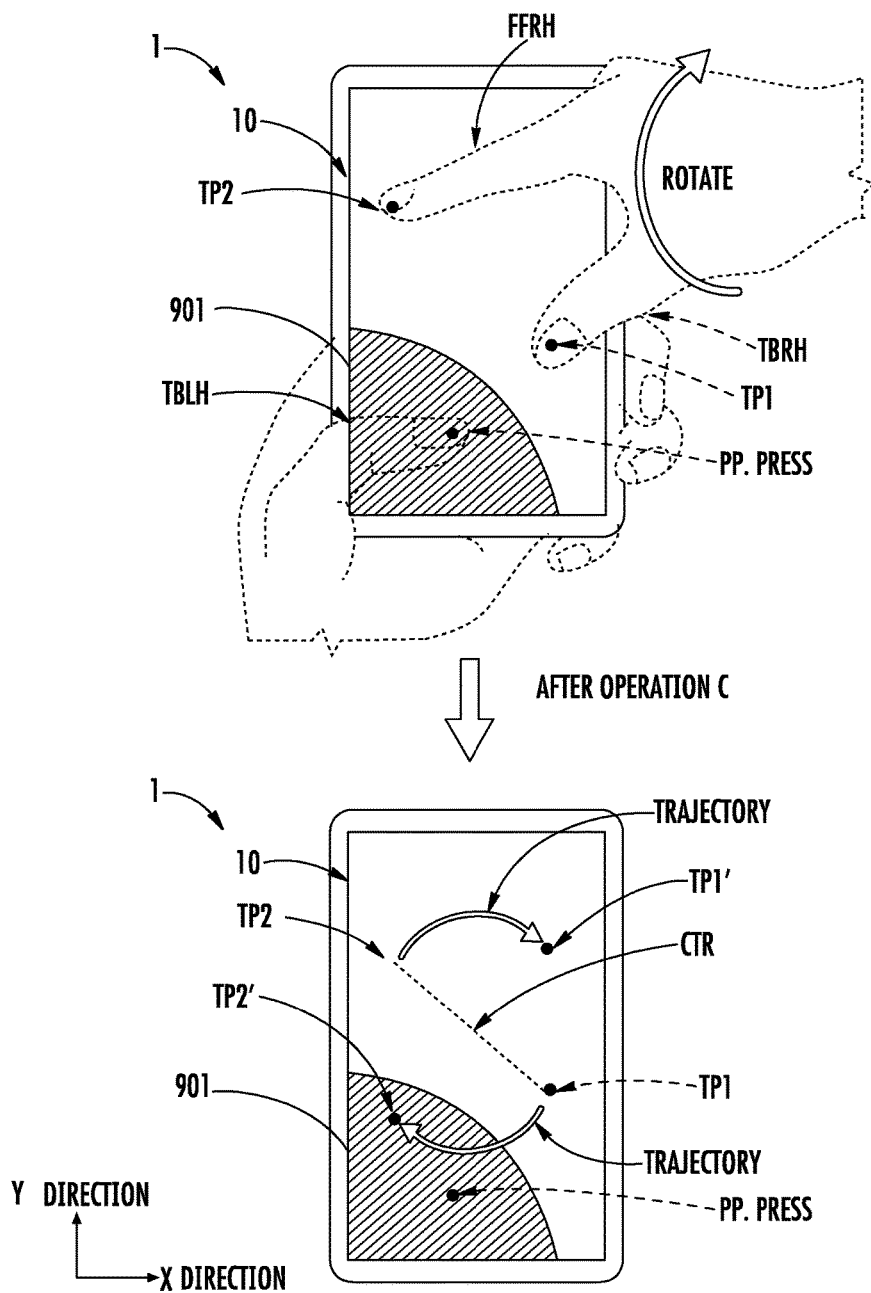
FIG. 10 is a view illustrating an example of an input operation to the operation terminal 1 according to the first embodiment.

FIG. 10 is a view illustrating another example of an operation with respect to the operation terminal 1. In the example in FIG. 10, the user performs the input operation C on the operation surface 2 of the operation terminal 1. The input operation C is an operation performed by moving two input operation touch positions along a circumference whose center CTR is a midpoint of the two touch positions while pressing the display input unit 10 as illustrated in FIG. 8. In the example illustrated in FIG. 10, processing in step S3 (FIG. 4) is the same as that in the example illustrated in FIG. 9. Hence, step S3 will not be described.

The control unit 14 refers to the database 140 and reads one input operation corresponding to two input operation touch positions (S4). For example, the control unit 14 reads the input operation B (a change of a distance between input operation touch positions).

Further, the control unit 14 determines whether the changes of the input operation touch positions match the input operation corresponding to the operation B (S5). In the example illustrated in FIG. 10, the distance Dis' between the input operation touch position VTP1' and the input operation touch position VTP2' is substantially the same as the distance Dis between the input operation touch position VTP1 and the input operation touch position VTP2. Hence, the control unit 14 determines that the changes of the input operation touch positions VTP1 and the input operation touch positions VTP2 do not match the input operation B (S5: NO) and reads the next input operation C (arc movement whose center is a midpoint of the input operation touch positions) stored in database 140 for two input operation touch positions (S7).

In the example illustrated in FIG. 10, a trajectory from the input operation touch position VTP 1 to the input operation touch position VTP 1' and a trajectory from the input operation touch position VTP2 to the input operation touch position VTP2' lie along the circumference whose center CTR is the midpoint of the input operation touch position VTP1 and the input operation touch position VTP2. In this regard, each trajectory does not need to lie strictly along the circumference. For example, the control unit 14 may calculate the shortest distance (mm) to the circumference from each input operation touch position which forms a trajectory, and, when a sum of the calculated shortest distances (mm) is smaller than a predetermined threshold, the control unit 14 may determine that the changes of the input operation touch positions match the operation input condition corresponding to the operation C. In addition, the control unit 14 obtains and stores information of each input operation touch position at a predetermined time interval to detect each input operation touch position which forms a trajectory.

Next, an operation of a control unit 14A of an operation terminal 1A according to the second embodiment will be described. The operation of the control unit 14A of the operation terminal 1A differs from an operation of a control unit 14 of an operation terminal 1 mainly in the way it distinguishes between a support position PP and input operation touch positions VTP. The configuration of the operation terminal 1A is the same as a configuration of the operation terminal 1. Hence, an overlapping configuration and operation will not be described.

Figure 11:
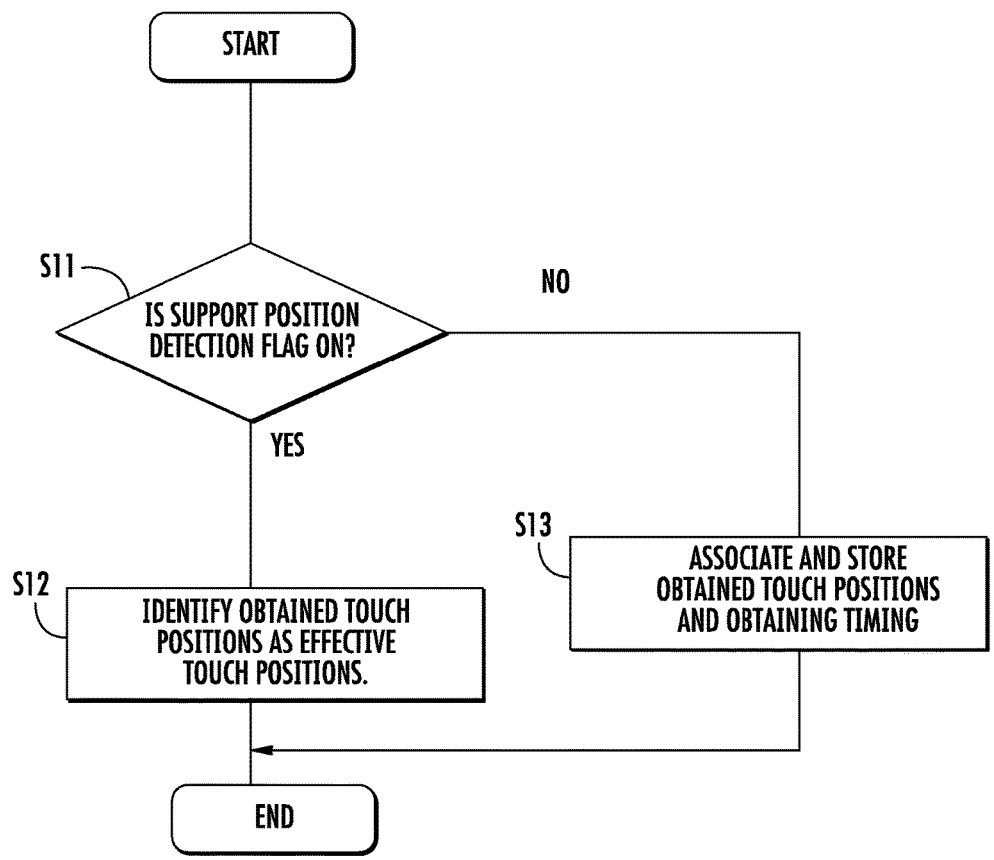
FIG. 11 is a flowchart illustrating an operation of a control unit 14A of an operation terminal 1A according to a second embodiment.
Figure 12:
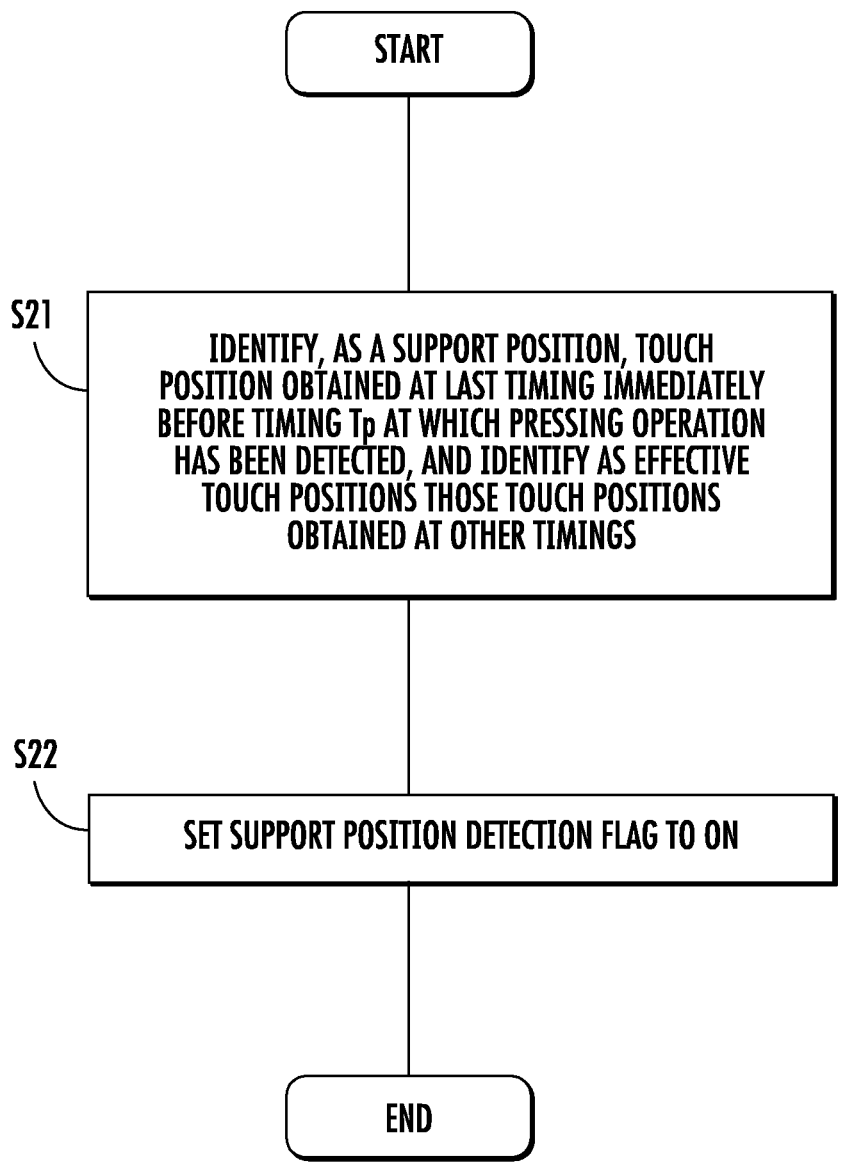
FIG. 12 is a flowchart illustrating the operation of the control unit 14A of the operation terminal 1A according to the second embodiment.
Figure 13:
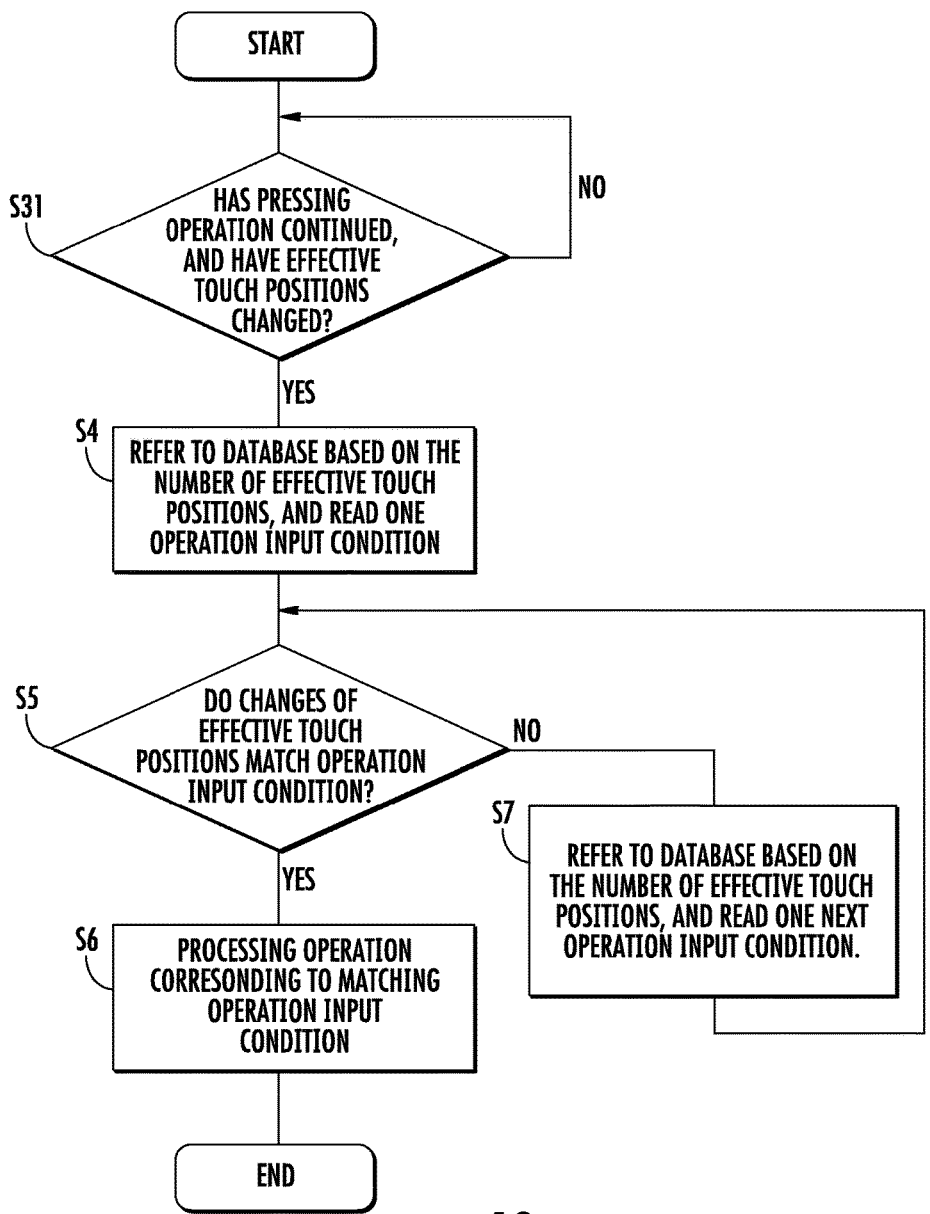
FIG. 13 is a flowchart illustrating the operation of the control unit 14A of the operation terminal 1A according to the second embodiment.

FIGS. 11, 12 and 13 are flowcharts illustrating operations of the control unit 14A of the operation terminal 1A, respectively. The control unit 14A preferably executes processing of the flowcharts illustrated in FIGS. 11, 12 and 13, respectively, in parallel.

The flowcharts illustrated in FIGS. 11 and 12, respectively, indicate how touch positions detected by a position detecting unit 13 are distinguished to be the support position PP or the input operation touch positions VTP.

The processing of the flowchart illustrated in FIG. 11 is started when the position detecting unit 13 detects touch positions and outputs information concerning the coordinates of the touch positions to the control unit 14A (Start).

The control unit 14A determines whether the support position detection flag is on (S11). If it is, this indicates that a pressing operation has been detected and one of touch positions has been identified as the support position PP. When the support position detection flag is off this indicates that a pressing operation has not yet been detected. In a default state (a state wherein no touch positions have been detected), the support position detection flag is off. When the support position detection flag is on (S11: YES), the control unit 14A moves to step S12. When the support position detection flag is off (S11: NO), the control unit 14A moves to step S13.

When the support position detection flag is on (S11: YES), the control unit 14A determines that the touch positions obtained at the start of the flowchart illustrated in FIG. 11 are input operation touch positions VTPn (a natural number n is the number of input operation touch positions) (S12). That is, positions which are newly touched after a pressing operation has been detected are determined to be the input operation touch positions VTPn. When the support position detection flag is off (S11: NO), the control unit 14A associates and stores the obtained touch positions and a timing at which the touch positions have been obtained (S13). The control unit 14A does not identify the touch position as either the support position PP or the input operation touch positions VTPn at this point of time in step S13.

The processing of the flowchart illustrated in FIG. 12 is started when a pressing force detecting unit 21 detects a pressing operation and outputs information indicating that the pressing operation has been performed to the control unit 14A.

Control unit 14A then identifies the touch position detected at a last timing immediately before a timing Tp at which the information indicating that the pressing operation has been performed has been obtained, and identifies it as the support position PP. It further identifies the touch positions detected at a timing other than the last timing (S21) as the input operation touch positions VTPn. Further, the control unit 14A sets the support position detection flag to ON (S22).

In, for example, a state where the operation surface 2 of the touch input unit 10 has is not yet been touched, when the user subsequently touches and keeps pressing the display input unit 10, the touched position becomes the support position PP and a position subsequently touched becomes the input operation touch position VTP1.

In another example, in a state where the display input unit 10 has not yet been touched, when the user touches the display input unit 10 with one of his or her fingers and, while keeping that finger in contact with the operation surface 2, touches the operation surface 2 with a second of his or her fingers and then carries out a pressing operation with his or her second finger, the last touched position becomes the support position PP and the first touched position becomes the input operation touch position VTP1.

The flowchart illustrated in FIG. 13 relates to operation input processing carried out by arithmetic module 40. The flowchart illustrated in FIG. 13 differs from the flowchart illustrated in FIG. 7 in that it does not perform steps Si to S3 but performs step S31 first.

First, the control unit 14 determines whether a pressing operation has been performed and whether the input operation touch positions VTPn have changed (S31). When it determines that the pressing operation has been performed and the input operation touch positions VTPn have changed (S31: YES), the control unit 14A moves to step S4. When it determines that the pressing operation has not been performed and the input operation touch positions VTPn have not changed (S31: No), it stands by.

The control unit 14 finds an input operation matching changes of the input operation touch positions VTPn in processing subsequent to step S4 and performs operation terminal processing which corresponds to the input operation.

As described above, by distinguishing the support position PP and the input operation touch positions VTPn as a function of a timing at which a pressing operation has been detected and a timing at which a touch position has been detected, instead of using an area to which the touch positions belong, the user can reliably input an input operation while applying a pressing force to the operation surface 2 by moving the input operation touch positions VTPn while pressing the support position PP.

Next, an operation of the arithmetic circuit module 40 (more particularly the control unit 14B) of an operation terminal 1B according to a third embodiment will be described. The operation of the control unit 14B of the operation terminal 1B differs from respective operations of a control unit 14 of an operation terminal 1 and a control unit 14A of an operation terminal 1A mainly in the way it distinguishes a support position PP and the input operation touch positions VTPn. A configuration of the operation terminal 1B is the same as a configuration of the operation terminal 1. Hence, an overlapping configuration and operation will not be described.

The control unit 14B of the operation terminal 1B according to the third embodiment differs from the respective operations of the control unit 14 and the control unit 14A in identifying a support position from the plurality of touch positions.

The user's finger used to input the pressing operation does not move in some cases. Hence, the control unit 14B identifies a touch position whose change amount is minimum as the support position PP at which a pressing operation is performed. The control unit 14B may identify the support position PP according the following method.

Figure 14:
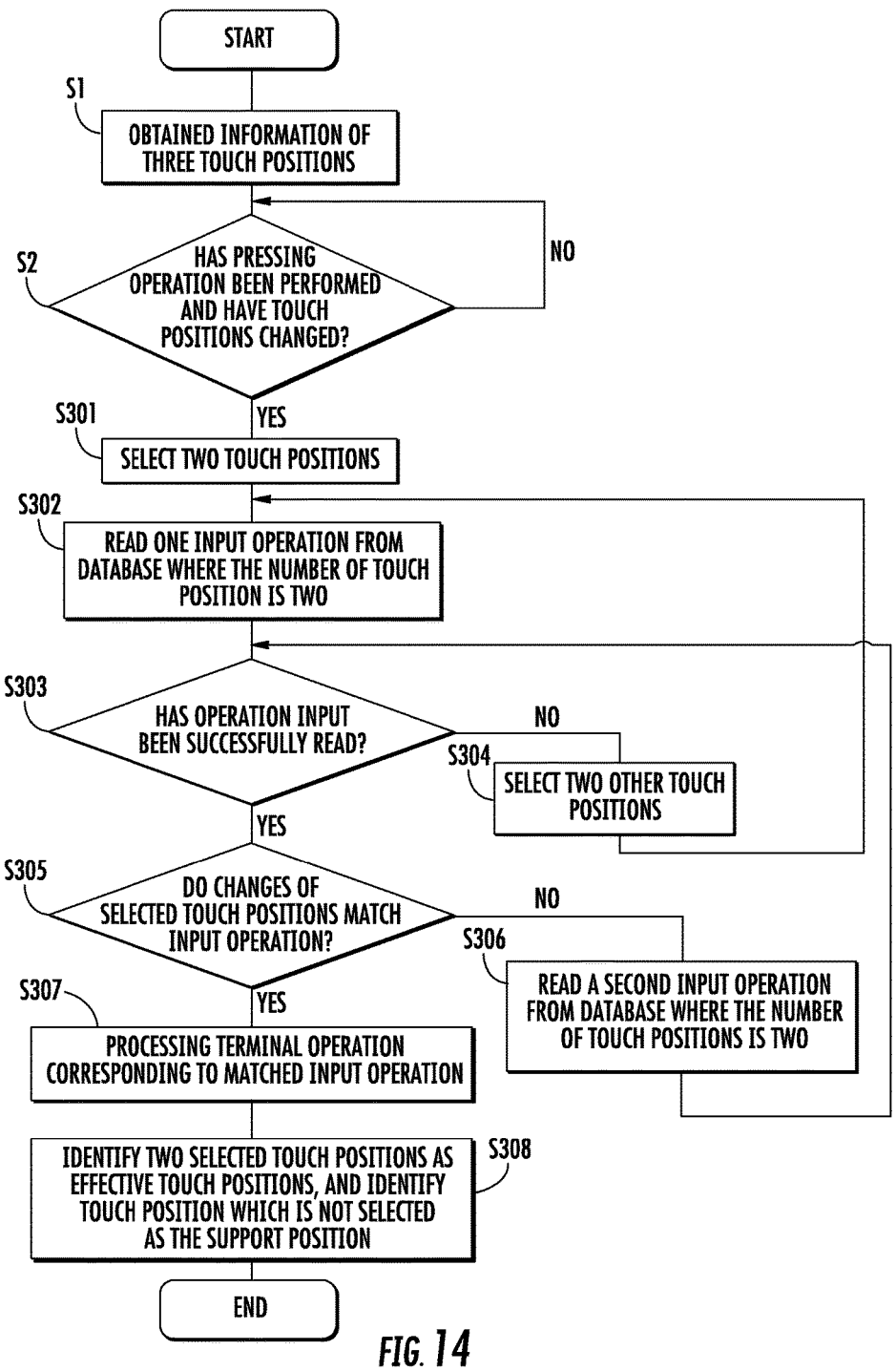
FIG. 14 is a flowchart illustrating an operation of a control unit 14B of an operation terminal 1B according to a third embodiment.

FIG. 14 is a flowchart illustrating the operation of the arithmetic circuit module (more particularly of the control unit 14B) of the operation terminal 1B. Processing in step Si and step S2 of the flowchart illustrated in FIG. 14 is the same as processing in step Si and step S2 of the flowchart illustrated in FIG. 7. In the flowchart illustrated in FIG. 14, the number of touch positions is limited to three for ease of description.

When determining that a pressing operation has been performed on a display input unit 10 and touch positions have changed (S2: YES), the control unit 14B arbitrarily selects two touch positions from the three touch positions (S301) detected. The control unit 14B refers to a database 140 and reads out a first input operation corresponding to two input operation touch positions (S302). In this regard, the database 140 stores input operations the number of which corresponds to the number of input operation touch positions, and therefore the control unit 14B refers to the database 140 by reading the number of touch positions as the number of input operation touch positions VTP.

When a pressing operation has been performed and touch positions have changed (S303: YES), the control unit 14B determines whether or not changes of the two arbitrarily selected touch positions match the read input operation (S305). Processing in step S305 differs from processing in step S5 of the flowchart illustrated in FIG. 7 in using the two arbitrarily selected touch positions to determine whether they are input operation touch positions VTP. When the changes of the two arbitrarily selected touch positions match the read input operation (S305: YES), the control unit 14B moves to step S307. When the changes of the two arbitrarily selected touch positions do not match the read input operation (S305: YES), the control unit 14B moves to step S306.

When the changes of the two arbitrarily selected touch positions do not match the read input operation (S305: NO), the control unit 14B refers to the database 140 under a condition that the number of touch positions is two, and reads another input operation (arbitrarily referred to as the second input operation) (S306). Further, the control unit 14B returns to step S303.

When the changes of the arbitrarily selected touch positions do not match any of input operations even after processing in step S303 and step S305 is repeated, there is no further operation input condition to read (S303: NO) and the control unit 14B moves to step S304.

When there is no input operation to read (S303: NO), the control unit 14B selects two different touch positions of the three touch positions (i.e., a different subset of the three touch positions) (S304). Further, the control unit 14B returns to step S302, and repeats processing in step S303 to step S306 by using the two touch positions selected again.

As described above, the control unit 14B selects again the two touch positions from the three touch positions until changes of the two touch positions match one of input operations.

When the changes of the two selected touch positions match the read input operation (S305: YES), the control unit 14B performs terminal processing corresponding to the matching input operation (S307). Further, the control unit 14B identifies the two selected touch positions as the input operation touch positions VTP1 and VTP2, and identifies as the support position PP the touch position which was not selected (S308).

The above example is an example where three touch positions are detected. However, when detecting two touch positions, the control unit 14B may estimate one touch position as the support position PP and distinguish the other touch position as the input operation touch position VTP 1 or estimate one touch position of four or more touch positions as the support position PP and distinguish the rest of the touch positions as input operation touch positions VTPn.

DESCRIPTION OF REFERENCE SYMBOLS 1, 1A, 1B OPERATION TERMINAL
2 OPERATION SURFACE
10 TOUCH INPUT UNIT
11 DISPLAY UNIT
12 ELECTROSTATIC SENSOR
13 POSITION DETECTING UNIT
14, 14A, 14B CONTROL UNIT
15 DISPLAY CONTROL UNIT
20 PIEZOELECTRIC SENSOR
21 PRESSING FORCE DETECTING UNIT
30 HOUSING
40 ARITHMETIC CIRCUIT MODULE
111 LIQUID CRYSTAL PANEL
112 TOP SURFACE POLARIZING PLATE
113 BACK SURFACE POLARIZING PLATE
114 BACKLIGHT
121 BASE FILM
122,123 CAPACITANCE DETECTION ELECTRODE
124 INSULATION FILM
140 DATABASE
201 PIEZOELECTRIC FILM
202, 203 PIEZOELECTRIC DETECTION ELECTRODE
901 AREA

The invention claimed is:

1. A touch input device comprising:
a sensor for detecting at least three touch positions at which a touch operation has been performed on an input operation surface;
a pressure sensor for detecting a pressing operation which has been performed on the input operation surface at least one of the touch positions; and
a controller which causes the input device to carry out an operation identified by an input operation applied to the input operation surface by:
(a) identifying a first of the touch positions as a support position which is not used by the controller unit to determine an input operation;
(b) identifying at least second and third of the touch positions as input touch positions used to input information into the input device by way of movement of the input touch positions; and
(c) causing the input device to carry out:
a first operation identified by the movement of the input touch positions when the controller determines that a pressing operation has not been performed at at least one of the input touch positions but at least one of the touch positions has changed; and
a second operation, different than the first operation, when the controller determines that a pressing operation has been performed at at least one of the input touch positions and at least one of the touch positions has changed.

2. The touch input device according to claim 1, wherein the control unit identifies the first touch position as a support position as a function of the location of the first touch position on the operation surface.

3. The touch input device according to claim 1, wherein the control unit identifies the touch position falling within a predetermined area of the operation surface as the support position.

4. The touch input device according to claim 3, wherein the predetermined area is located adjacent a corner of the operation surface.

5. The touch input device according to claim 1, wherein the control unit uses the movement of the input touch positions which occur after a pressing force has been applied at the support position to identify the operation carried out by the input device.

6. The touch input device according to claim 1, wherein the control unit causes the input device to carry out an operation identified by the movement of the input touch positions only during the time period during which a pressing operation is applied to the operation surface.

7. The touch input device according to claim 1, wherein the control unit causes the input device to carry out an operation identified by variations in a pressing force applied to the operation surface at the support position.

8. The touch input device according to claim 1, wherein the control unit identifies first of the touch positions as the support position as a function of the order in which the touch operations were carried out at each of the touch positions.

9. The touch input device according to claim 8, wherein the control unit identifies the touch position at which a touching operation was first carried out as the support position.

10. The touch input device according to claim 8, wherein the control unit identifies all of the touch positions, other than the touch position at which a touching operation was first carried out, as the input touch positions.

11. The touch input device according to claim 10, wherein before any pressing operation has been performed at any of the touch positions, the control unit stores, for each touch position, the location of the touch position on the operation surface and the timing at which a touch operation was applied at the touch position.

12. The touch input device according to claim 11, wherein the control unit identifies the touch position at which a pressing operation was first carried out as the support position.

13. The touch input device according to claim 1, wherein the control unit identifies each respective touch position as either the support position or one of the input touch positions as a function of (a) whether a pressing operation was carried out the respective touch position and (b) the timing at which a touch operation was performed at the respective touch position.

14. The touch input device according to claim 1, wherein the control unit identifies the touch position which is the support position as a function of the movements of all of the touch positions.

15. The touch input device according to claim 1, wherein the control unit identifies the touch position which has the least movement over a predetermined period as the support position.

16. The touch input device according to claim 1, wherein the control unit identifies the first of the touch positions as the support position by comparing the movement of different sub-combinations of the touch positions to a pre-stored sequence of movements of the input touch positions.

17. The touch input device according to claim 1, wherein the control unit identifies the first of the touch positions as the support position by comparing the movement of different sub-combinations of the touch positions to a pre-stored set of input operations, each input operation of the set corresponding to a different sequence of movements.

18. The touch input device according to claim 1, wherein the pressure sensor includes a piezoelectric film made of a chiral polymer.

19. The touch input device according to claim 18, wherein the chiral polymer is uniaxially stretched polylactic acid.

20. The touch input device according to claim 1, wherein the sensor for detecting a plurality of touch positions is a capacitive sensor.

* * * * *